United States Patent [19]

Leverenz

[11] 3,968,099

[45] July 6, 1976

[54] PROCESS FOR THE PREPARATION OF AZO DYESTUFFS CONTAINING CYANO GROUPS

[75] Inventor: Klaus Leverenz, Leverkusen, Germany

[73] Assignee: Bayer Aktiengesellschaft, Leverkusen, Germany

[22] Filed: Jan. 17, 1975

[21] Appl. No.: 542,051

[30] Foreign Application Priority Data

Jan. 19, 1974 Germany........................... 2402544

[52] U.S. Cl................................ 260/208; 260/205; 260/206; 260/207; 260/207.1; 260/207.5; 260/465 R
[51] Int. Cl.².......................................... C09B 43/00
[58] Field of Search ........ 260/205, 206, 207, 207.1, 260/207.5, 208, 465 R

[56] References Cited
FOREIGN PATENTS OR APPLICATIONS
1,184,825   3/1970   United Kingdom................. 260/205

Primary Examiner—Charles F. Warren
Attorney, Agent, or Firm—Plumley and Tyner

[57] ABSTRACT

The invention relates to the preparation of ortho-cyano azo dyestuffs by conversion of azo dyestuffs of the formula

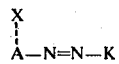

wherein
A is an aromatic-carbocyclic radical,
K is the radical of a component and
X is a chlorine, bromine or iodine atom which is in the o-position to the azo group with CuCN or CuCN-forming compounds in polar organic sovents in the presence of azoles.

3 Claims, No Drawings

PROCESS FOR THE PREPARATION OF AZO DYESTUFFS CONTAINING CYANO GROUPS

The invention relates to an improved process for the preparation of azo dyestuffs containing cyano groups, of the general formula

wherein
A is an aromatic-carbocyclic radical in which the CN substituent is in the o-position relative to the azo group and
K is the radical of a coupling component.

The process is characterized in that azo dyestuffs of the general formula

wherein
A and K have the abovementioned meaning and
X is a chlorine, bromine or iodine atom which is in the o-position to the azo group
are reacted with CuCN or CuCN-forming compounds in polar organic solvents having a dielectric constant of >10 in the presence of five-membered nitrogen-containing hetero-aromatic compounds (azoles), with replacement of the halogen substituent X by a cyano substituent.

The radicals A and K which have been mentioned can possess further substituents customary in azo dyestuffs, such as halogen, alkyl, aralkyl, aryl, alkoxy, nitro, cyano, trifluoroalkyl, sulphone, acylamino, acyl, primary, secondary and tertiary amino, hydroxyl, carboxylic acid, sulphonic acid, carboxylic acid ester or optionally substituted carboxylic acid amide or sulphonic acid amide groups, and other groupings.

A class of dyestuffs to be prepared preferentially within the scope of the products of the formula I corresponds to the general formula

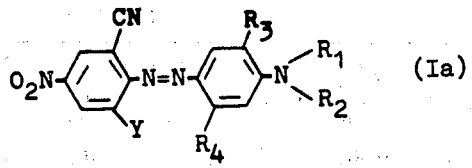

wherein
$Y = F, Cl, Br, CF_3, CN, NO_2, SO_2R_5$ or $COR_5$,
$R_1 = H$, $C_1-C_4$-alkyl, $C_1-C_4$-alkyl monosubstituted by OH, Cl, $OCOR_5$, $OCO_2R_5$, $OCONH_2$, $OCONHR_5$, CN, $OR_5$ or phenyl-$C_1-C_4$-alkyl,
$R_2 = R_1$, cyclohexyl or phenyl,
$R_3 = H$, $CH_3$, $OCH_3$ or $OC_2H_5$,
$R_4 = H$, $CH_3$, Cl, $OCH_3$, $OC_2H_5$, CN, $NHCOR_5$, $NHCO_2R_5$, $NHSO_2R_5$, $NHCONH_2$ or $NHCONHR_5$ and
$R_5 = C_1-C_4$-alkyl, cyclohexyl, phenyl, chlorophenyl, tolyl or methoxyphenyl.

Very particularly preferred dyestuffs are those of the formula Ia, wherein
$R_4 = NHCOR_5$ or $NHCO_2R_5$ and
$Y = CN, NO_2$ or $SO_2R_5$.

It is already known to prepare compounds of the formula I by replacing the halogen substituent X in II by a CN group in polar organic solvents - admittedly in the absence of azoles (compare British patent specification No. 1,125,683).

Compared to this method, the process according to the invention has the advantage that it gives the products (I) of the process in shorter reaction times and/or higher purity.

The following are examples of polar organic solvents which can be used: ethylene glycol, ethylene glycol monomethyl ether and monoethyl ether, diethylene glycol, triethylene glycol, diethylene glycol monomethyl ether and monoethyl ether, propylene glycol, dipropylene glycol, acetonitrile, benzonitrile, diethylformamide, dimethylsulphoxide, N-formylmorpholine, hexamethylphosphoric acid tris-amide, N-methylpyrrolidone, nitrobenzene, nitromethane, nitropropane, tetramethylenesulphone and especially dimethylformamide and mixtures of these solvents.

The following may be mentioned as azoles to be used according to the invention: pyrrole, pyrazole, imidazole, oxazole, isoxazole, thiazole, isothiazole, indazole, benzimidazole, benzoxazole and benzthiazole, which can be substituted by hydrocarbon radicals, preferably methyl groups, such as, for example, 1-methylimidazole, 2-methyl(imidazole, 5-methyl-isoxazole, 4,5-dimethyl-thiazole, 2-methyl-benzthiazole, 2-methyl-benzimidazole, 2-methyl-benzoxazole, 4,5-diphenyl-imidazole and 2,3,3-trimethyl-indolenine.

Copper-(I) cyanide can be employed as such, preferably in a finely powdered form, or can be formed in the reaction medium from copper-(I) acetate, copper-(I) chloride or copper-(I) bromide and alkali metal cyanides.

The reaction temperature can be varied within a broad range and depends on the solvent used and on the structure of the starting compounds of the formula II. In general, the reaction is carried out at temperatures between 20° and 150°C, preferably 40° and 120°C.

In most cases, temperatures below 100°C suffice. The reaction is carried out by dissolving or suspending the starting dyestuffs of the formula II and the azole in a 1-fold to 5-fold amount by weight (relative to II) of the particular organic solvent, adding copper-(I) cyanide or the compounds which form copper-(I) cyanide and completing the reaction, if appropriate with warming. The course of the reaction can be followed by thin layer chromatography. Per mol halogen atom to be replaced, at least 1 mol of copper-(I) cyanide or CuCN-forming compounds and 0.1–1 mol of the azole are used. However, as a rule an excess of the azole does not interfere.

The isolation and working up can be carried out in a manner which is in itself known (compare British patent specification No. 1,125,683).

The new process is explained in more detail by the examples which follow.

The dyestuffs obtained according to the claimed process are well known compounds which are outstanding suitable for the dyeing and printing of synthetic fibre materials, especially of cellulose esters and aromatic polyesters, according to conventional dyeing methods.

Moreover, the dyestuffs may be used for the dyeing from organic solvents, such as tetrachloroethylene, and for the so-called transfer printing process.

The dyeings which are obtained in deep shades using the aforementioned dyeing process are distinguished by good general fastness properties.

EXAMPLE 1

34 g of the dyestuff of the formula

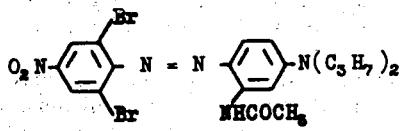

in 50 ml of dimethylformamide, with the addition of 4 g of imidazole, are reacted with 10.4 g of copper-(I) cyanide for 1 hour at 90°–95°C. The reaction products are precipitated by adding 50 ml of water and are introduced into a solution of 20.8 g of iron-(III) chloride in 200 ml of 10% strength hydrochloric acid to remove copper-(I) salts. After stirring for some time, the dyestuff of the formula

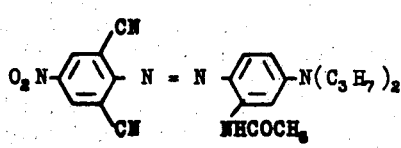

is filtered off, washed with water until neutral and dried. The yield is approx. 95% of theory. The product obtained dyes polyester fibres in clear blue shades of very good fastness to light and to sublimation.

EXAMPLE 2

28.6 g of the dyestuff of the formula

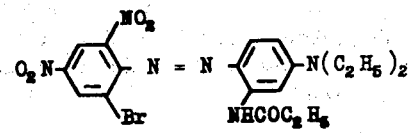

in 100 ml of diethylene glycol, with the addition of 4.2 g of 1-methyl-imidazole, are heated with 5.2 g of copper-(I) cyanide for 30 minutes to 100°–120°C. The reaction mixture is diluted with water and the precipitate is filtered off and introduced into a solution of 10.4 g of iron-(III) chloride in 200 ml of 10% strength hydrochloric acid in order to remove copper-(I) salts. After stirring for several hours, the dyestuff of the formula

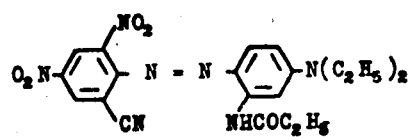

is filtered off, washed with water and dried. It dyes polyester fibres in clear blue shades having good general fastness properties.

The table which follows lists further examples of reactions of dyestuffs of the general formula A to give dyestuffs of the general formula B:

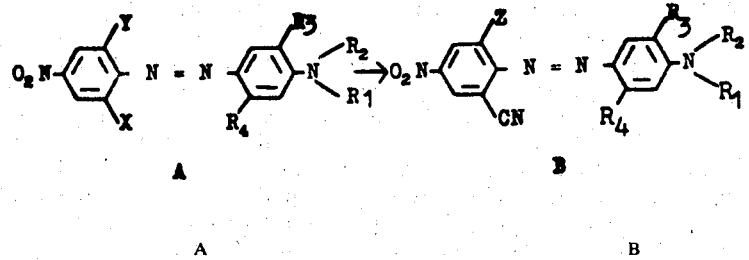

| Example No. | X | Y | $R_3$ | $R_1$ | $R_2$ | $R_4'$ | Z | $R_4$ |
|---|---|---|---|---|---|---|---|---|
| 3 | Cl | Cl | H | $C_2H_5$ | $C_3H_7$ | $NHCOCH_3$ | Cl | $NHCOCH_3$ |
| 4 | Br | Br | H | $C_2H_5$ | $C_2H_5$ | $NHCOCH_3$ | CN | $NHCOCH_3$ |
| 5 | Br | $NO_2$ | H | $C_4H_9$ | $CH_2CH_2OCOC_6H_5$ | H | $NO_2$ | H |
| 6 | Br | $SO_2CH_3$ | H | $C_2H_5$ | $C_2H_5$ | $NHCOOC_2H_5$ | $SO_2CH_3$ | $NHCOOCH_3$ |
| 7 | Br | $NO_2$ | $OCH_3$ | $C_2H_5$ | $C_2H_5$ | Br | $NO_2$ | CN |
| 8 | J | J | H | $C_4H_9$ | $C_4H_9$ | $CONH_2$ | CN | $CONH_2$ |
| 9 | Br | $CF_3$ | H | $CH_3$ | $CH_3$ | H | $CF_3$ | H |
| 10 | Br | $NO_2$ | H | $C_2H_5$ | $CH_2CH_2OCOCH_3$ | $CH_3$ | $NO_2$ | $CH_3$ |
| 11 | Cl | $NO_2$ | H | $C_2H_5$ | $C_2H_5$ | $NHSO_2CH_3$ | $NO_2$ | $NHSO_2CH_3$ |
| 12 | Br | $NO_2$ | $OC_2H_5$ | H | ⟨H⟩ | $CONHCH_3$ | $NO_2$ | $CONHCH_3$ |
| 13 | Br | $NO_2$ | H | H | ⟨Cl⟩ | $NHCOCH_3$ | $NO_2$ | $NHCOCH_3$ |
| 14 | Br | Br | H | $CH_2$—CH—$CH_2$<br>   OH   OH | $CH_2CH_2CN$ | $NHCOCH_3$ | CN | $NHCOCH_3$ |
| 15 | Br | CN | $OCH_3$ | $CH_2$-⟨⟩ | H | $NHCOCH_3$ | CN | $NHCOCH_3$ |
| 16 | Br | $NO_2$ | H | $CH_2$—CH—$CH_2$<br>   OH   Cl | $CH_2$—$CH_2$—CN | $NHCOCH_3$ | $NO_2$ | $NHCOCH_3$ |
| 17 | Br | Br | H | $CH_2$—CH—$CH_2$<br>   OH   Cl | $CH_2$—$CH_2$—CN | $NHCOCH_3$ | CN | $NHCOCH_3$ |

| Example No. | Solvent | Azole | Colour shade on polyester |
|---|---|---|---|
| 3 | Tetramethylenesulphone | 2-Methyl-benzthiazole | blue |
| 4 | Ethyl glycol/dimethylformamide | Benzimidazole | blue |
| 5 | Dimethylsulphoxide | 1-Methylimidazole | violet |
| 6 | Dimethylformamide | 2-Methyl-benzoxazole | blue |
| 7 | N-Methylpyrrolidone | Imidazole | blue |
| 8 | Tetramethylurea | 4,5-Dimethylthiazole | blue |
| 9 | Diethylene glycol monomethyl ether | 2-Methylimidazole | violet |
| 10 | Nitrobenzene | Imidazole | blue |
| 11 | Diethylformamide | 2-Methyl-benzimidazole | blue |
| 12 | N-Formylmorpholine | 1-Methyl-benzimidazole | blue-green |
| 13 | Ethylene glycol | Pyrazole | blue |
| 14 | Dipropylene glycol | Imidazole | blue |
| 15 | Butanol | Imidazole | blue-green |
| 16 | Ethyl glycol | 1-Methylimidazole | blue |
| 17 | Dimethylacetamide | Benzimidazole | blue |

I claim:

1. Process for the preparation of an azo dyestuff which contains in the diazo component at least one cyano group in the orthoposition to the azo bridge, which comprises reacting an azo dyestuff of the general formula

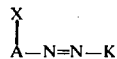

wherein
A is an aromatic-carbocyclic radical,
K is the radical of a coupling component and
X is a chlorine, bromine or iodine atom which is in the o-position to the azo group with CuCN or CuCN-forming compounds in polar organic solvents having a dielectric constant of >10 in the presence of an azole selected from the group consisting of imidazole, 1-methylimidazole, 2-methylimidazole, benzimidazole, 1-methylbenzimidazole, 2-methylbenzimidazole, 2-methylbenzthiazole, 4,5-dimethylthiazole, 2-methylbenzoxazole, and pyrazole, and recovering said azo dyestuff wherein the halogen substituent X is replaced by a cyano substituent.

2. Process according to claim 1 wherein the reaction is carried out at temperatures of 40° to 120°C.

3. Process according to claim 1 wherein the reaction is carried out in dimethylformamide/imidazole.

* * * * *